(12) United States Patent
Yoon

(10) Patent No.: US 6,774,962 B2
(45) Date of Patent: Aug. 10, 2004

(54) LIQUID CRYSTAL DISPLAY DEVICE USING CHOLESTERIC LIQUID CRYSTAL AND A MANUFACTURING METHOD THEREOF

(75) Inventor: Sunghoe Yoon, Anyang-si (KR)

(73) Assignee: LG.Philips LCD Co., Ltd., Seoul (KR)

( * ) Notice: Subject to any disclaimer, the term of this patent is extended or adjusted under 35 U.S.C. 154(b) by 42 days.

(21) Appl. No.: 10/175,491

(22) Filed: Jun. 20, 2002

(65) Prior Publication Data

US 2003/0086032 A1 May 8, 2003

(30) Foreign Application Priority Data

Nov. 8, 2001 (KR) .......................................... 2001-69443

(51) Int. Cl.[7] .............................................. G02F 1/1335
(52) U.S. Cl. .......................................... 349/98; 349/96
(58) Field of Search ........................................ 349/96–98

(56) References Cited

U.S. PATENT DOCUMENTS

| 5,715,023 A | * | 2/1998 | Hoppe ......................... 349/11 |
| 6,597,418 B2 | * | 7/2003 | Moon et al. .................. 349/98 |
| 2003/0112392 A1 | * | 6/2003 | Moon et al. ................ 349/115 |

FOREIGN PATENT DOCUMENTS

JP         2003149635 A   *  5/2003  ......... G02F/1/1335

* cited by examiner

Primary Examiner—Huyen Ngo
(74) Attorney, Agent, or Firm—McKenna Long & Aldridge LLP

(57) ABSTRACT

A liquid crystal display device includes a liquid crystal cell having a cholesteric liquid crystal color filter; an integrated collimating polarizer under the liquid crystal cell, the integrated collimating polarizer having a collimating layer and a circular polarizer on the collimating layer; a backlight under the integrated collimating polarizer; a diffusing layer over the liquid crystal cell; a retardation layer over the diffusing layer; and a linear polarizer over the retardation layer.

6 Claims, 6 Drawing Sheets

LIQUID CRYSTAL DISPLAY DEVICE USING CHOLESTERIC LIQUID CRYSTAL AND A MANUFACTURING METHOD THEREOF

This application claims the benefit of Korean Patent Application No. 2001-69443, filed on Nov. 8, 2001, which is hereby incorporated by reference in its entirety for all purposes as if fully set forth herein.

BACKGROUND OF THE INVENTION

1. Field of the Invention

The present invention relates to a liquid crystal display (LCD) device, and more particularly to an LCD device using cholesteric liquid crystal and a manufacturing method thereof.

2. Discussion of the Related Art

Flat panel display (FPD) devices having small size, lightweight, and low power consumption have been a subject of recent research according to coming of the information age. Among many kinds of FPD devices, LCD devices are widely used for notebook personal computers (PCs) or desktop PCs because of their excellent characteristics of resolution, color display and display quality. Generally, in an LCD device, first and second substrates having respective electrodes are disposed to face each other with a liquid crystal layer is interposed therebetween. The liquid crystal layer has an optical anisotropy due to an electric field generated by applying a voltage to the respective electrodes. The LCD device displays images by using a transmittance difference according to the optical anisotropy of the liquid crystal layer.

FIG. 1 is a schematic cross-sectional view of a related LCD panel.

In FIG. 1, first and second substrates 10 and 20, referred to as lower and upper substrates, are facing and spaced apart from each other. A thin film transistor "T" (TFT) having a gate electrode 11, and source and drain electrodes 15a and 15b are formed on an inner surface of the first substrate 10. The TFT "T" further has an active layer 13 and an ohmic contact layer 14. A gate insulating layer 12 is formed on the gate electrode 11. A passivation layer 16 is formed on the TFT "T". The passivation layer 16 covers the TFT "T" and has a contact hole 16c exposing the drain electrode 15b of the TFT. A pixel electrode 17 is formed on the passivation layer 16 and connected to the drain electrode 15b through the contact hole 16c.

A black matrix 21 is formed on an inner surface of the second substrate 20 at a position corresponding to the TFT "T". A color filter layer 22a and 22b, in which colors of red (R), green (G) and blue (B) are alternately repeated, is formed on the black matrix 21. A common electrode 23 of transparent conductive material is formed on the color filter layer 22a and 22b. The color filter layer 22a and 22b of a single color corresponds to the one pixel electrode 17.

A liquid crystal layer 30 is interposed between the pixel and common electrodes 17 and 23. When a voltage is applied to the pixel and common electrodes 17 and 23, the arrangement of molecules of the liquid crystal layer 30 changes according to an electric field generated between the pixel and common electrodes 17 and 23. Orientation films (not shown) respectively formed on the pixel and common electrodes determine an initial arrangement of liquid crystal molecules.

First and second polarizers 41 and 42 are formed on outer surfaces of the first and second substrates 10 and 20, respectively. The first and second polarizers 41 and 42 convert natural light to linearly polarized light by transmitting only light whose polarizing direction is parallel to a transmission axis of the polarizer. The transmission axis of the first polarizer 41 is perpendicular to that of the second polarizer 42.

In FIG. 1, the TFT and the pixel electrode are formed on the lower substrate and the color filter layer and the common electrode are formed on the upper substrate. Recently, however, structures in which the TFT and the color filter layer are formed on the lower substrate, or the color filter layer and the common electrode are formed on the lower substrate and the TFT and the pixel electrode are formed on the upper substrate have been suggested.

Since an LCD device does not emit light for itself, an additional light source is necessary. Therefore, a backlight is disposed over the first polarizer 41 of FIG. 1 and light from the backlight is provided to a liquid crystal panel. Images are displayed by adjusting the light according to the arrangement of the liquid crystal layer. The LCD device of this structure is referred to as a transmissive LCD device. The pixel electrode 17 and the common electrode 23, two electrodes generating an electric field, are made of transparent conductive material and the first and second substrates 10 and 20 are also transparent.

Since only one polarizing component of the incident light is transmitted through the polarizer used in the LCD device and the other components are absorbed and then converted into heat loss, brightness of the LCD device is reduced by more than 50% considering reflection at a surface of the polarizer. To improve the brightness of the LCD device by reducing the heat loss, an LCD device having a reflective circular polarizer under the device is suggested. The circular polarizer transmits one circular polarizing component of the incident light and reflects the other components. The reflected circular polarizing components are reflected again by several optical parts under the circular polarizer and converted into a light component capable of passing the circular polarizer. Theoretically, since all the incident light is converted into one component and then transmits through the circular polarizer, loss of light occurring in a conventional linear polarizer is remarkably reduced.

FIG. 2 is a schematic cross-sectional view of a related art LCD device.

In FIG. 2, a first polarizer 42 that is a linear polarizer is disposed under a liquid crystal cell 41, in which a liquid crystal layer is interposed between two substrate having respective electrodes on inner surfaces. A retardation layer 43, which converts linear polarization into circular polarization and vice versa, and a second polarizer 45 that is a linear polarizer are disposed under the first polarizer 42. A compensation film 44 can be interposed between the retardation layer 43 and the second polarizer 45. A sheet 46 for collecting and diffusing light and a backlight 47 are sequentially disposed under the second polarizer 45. On the other hand, a third polarizer 48 whose transmission axis is perpendicular to that of the first polarizer 42 is disposed over the liquid crystal cell 41. The liquid crystal cell 41 can have the same structure as or different structure from the liquid crystal cell of FIG. 1.

The second polarizer 45 can be made through forming a cholesteric liquid crystal layer 45b on a transparent substrate 45a. The cholesteric liquid crystal has a selective reflection property that only light of a specific wavelength is selectively reflected according to a helical pitch of the molecules of the cholesteric liquid crystal. The polarization of the reflected light is determined according to a rotational direction of the liquid crystal. For example, if a liquid crystal layer has a left-handed structure where liquid crystal molecules rotate counter clockwise along a rotational axis, only left-handed circularly polarized light having a corresponding color, i.e., wavelength, is reflected. Since the pitch of the cholesteric liquid crystal that light experiences is varied according to an incident angle, a wavelength of reflected light is also varied. Accordingly, there is a color shift such that a color of transmitted light varies according to a viewing angle. To compensate for the color shift, a compensation film 44 may be disposed over the second polarizer 45.

As shown in FIG. 2, a sheet 46 for collecting light from the backlight 47 and diffusing light to the liquid crystal cell 41 can be disposed between the second polarizer 45 and the backlight 47.

In the LCD device of FIG. 2, brightness is improved through increasing transmitted light by using a circular polarizer to a conventional LCD device. However, a conventional linear polarizer is still necessary because polarizing efficiency of the circular polarizer is lower than that of the linear polarizer. Moreover, a retardation layer should be attached for light that passes the circular polarizer to transmit through the linear polarizer. Therefore, production cost is high due to a plurality of films required for an increase in brightness. However, the increase in brightness is not large and a viewing angle is narrow.

On the other hand, a LCD device using a cholesteric liquid crystal color filter (CLC) has been researched and developed recently. Since cholesteric liquid crystal has a selective reflection property, brightness can be improved in contrast with a LCD device using a color filter of absorption type.

FIG. 3 is a cross-sectional view of a related art LCD device using a CLC.

In FIG. 3, a circular polarizer 53 using cholesteric liquid crystal is disposed under a liquid crystal cell 51 having a CLC color filter 52. A collection sheet 54 and a backlight 55 are sequentially disposed under the circular polarizer 53.

A diffusing sheet 56 for diffusing light transmitted through the liquid crystal cell 51 is disposed over the liquid crystal cell 51. A retardation layer 57 and a linear polarizer 58 are sequentially disposed over the diffusing sheet 56.

The collection sheet 54 for collecting light entering the circular polarizer 53 and the CLC 52 is made by forming a film 54b having a high condensing pattern on a transparent substrate 54a. The collection sheet 54 may be made of only the film 54b without the substrate 54a. Moreover, the backlight 55 may include the high condensing pattern or means.

In a LCD device having the structure of FIG. 3, a wavelength variation of reflected light according to an incident angle to the cholesteric liquid crystal is solved by using a high condensing backlight and a collection sheet. Moreover, the light efficiency increases by using a circular polarizer and a reflective CLC, and the collected light is diffused through a diffusing layer over the liquid crystal cell. Therefore, the brightness is improved in contrast with a related art LCD device of FIG. 2, and the problem of a color shift according to a viewing angle is solved. However, the production cost and the thickness of the LCD device also increase due to the individual circular polarizer and collection sheet.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display device of high brightness, wide viewing angle and low thickness with low cost and short manufacturing process by forming a circular polarizer and a collection sheet on one substrate.

Additional features and advantages of the invention will be set forth in the description that follows, and in part will be apparent from the description, or may be learned by practice of the invention. Other advantages of the invention will be realized and attained by the structure particularly pointed out in the written description and claims hereof as well as the appended drawings. To achieve these and other advantages and in accordance with the purpose of the present invention, as embodied and broadly described, a liquid crystal display device includes a liquid crystal cell; a collimating polarizer under the liquid crystal cell, the collimating polarizer having a collimating layer and a circular polarizer fixed on the collimating layer; a backlight under the collimating polarizer; a diffusing layer over the liquid crystal cell; a retardation layer over the diffusing layer; and a linear polarizer over the retardation layer.

In another aspect, a liquid crystal display device includes a liquid crystal cell; a collimating polarizer under the liquid crystal cell, the collimating polarizer having collimating layer, a circular polarizer and a transparent substrate between the collimating layer and the circular polarizer; a backlight under the collimating polarizer; a diffusing layer over the liquid crystal cell; a retardation layer over the diffusing layer; and a linear polarizer over the retardation layer. In another aspect, a fabricating method of a collimating polarizer for a liquid crystal display device includes providing a first transparent substrate; coating a cholesteric liquid crystal on the first transparent substrate; exposing and hardening the cholesteric liquid crystal to form a pitch of the cholesteric liquid crystal; coating a resin on the cholesteric liquid crystal; and patterning and hardening the resin to form a collimating layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included herewith to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, similar reference numbers will be used throughout the drawings to refer to the same or like parts.

Figure 1:
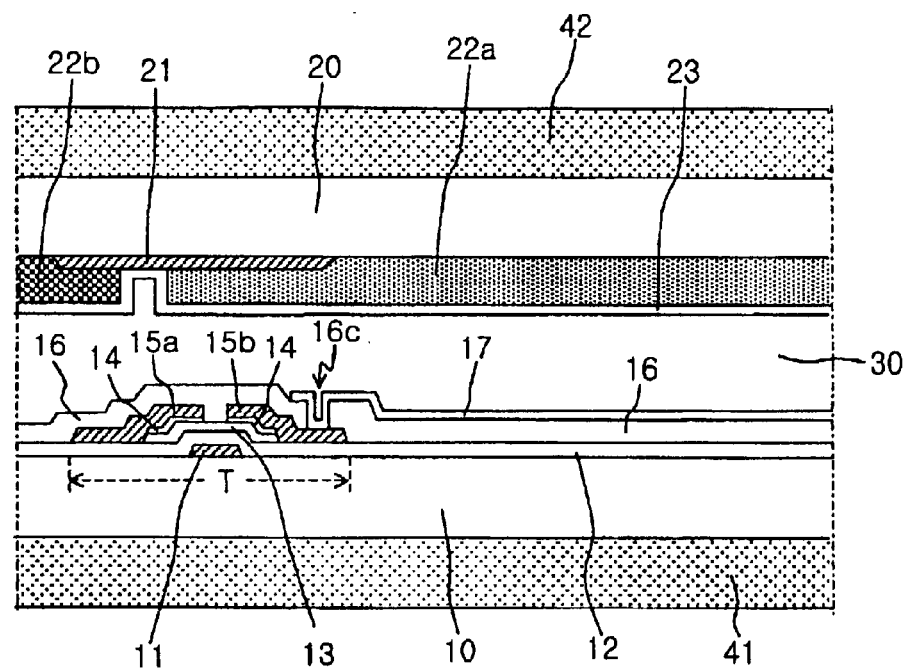
FIG. 1 is a schematic cross-sectional view of a related art LCD panel.
Figure 2:
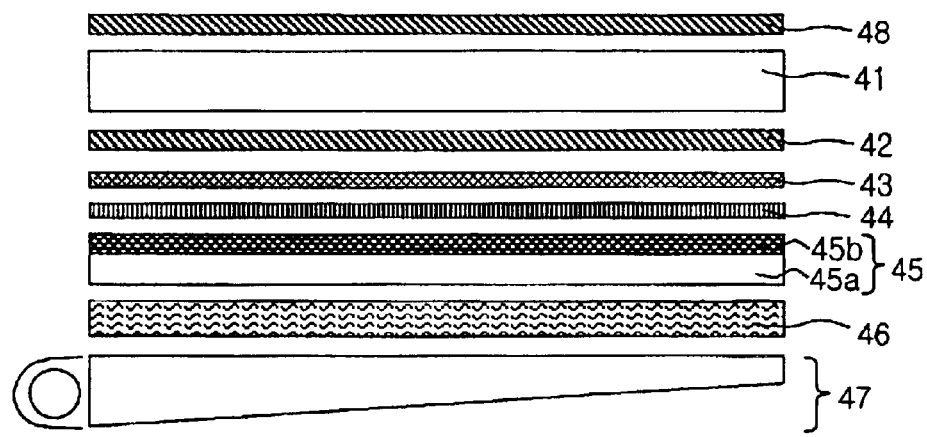
FIG. 2 is a schematic cross-sectional view of a related art LCD device.
Figure 3:
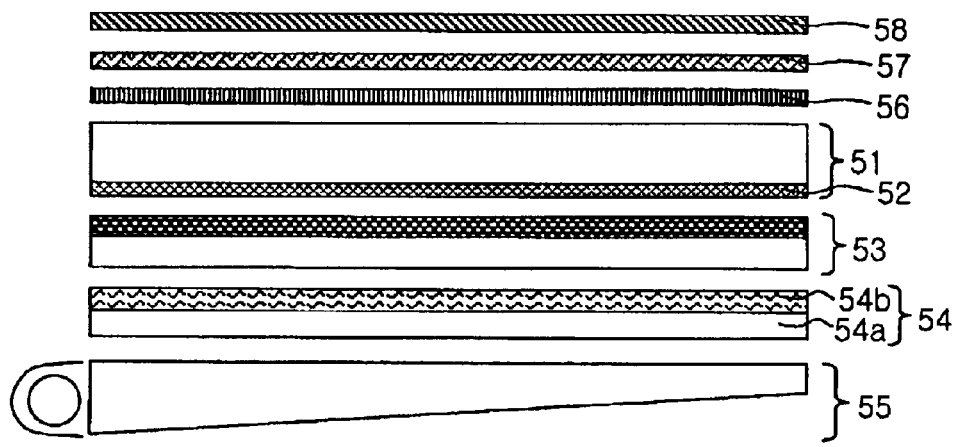
FIG. 3 is a cross-sectional view of a related art LCD device using a CLC.
Figure 4:
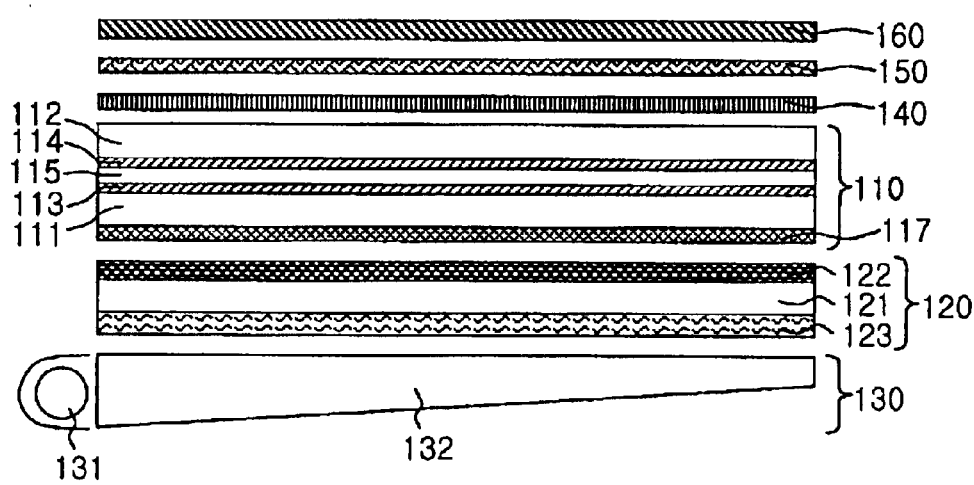
FIG. 4 is a schematic cross-sectional view of an LCD device according to a first embodiment of the present invention.

FIG. 4 is a schematic cross-sectional view of an LCD device according to a first embodiment of the present invention.

In FIG. 4, a collimating polarizer 120 is disposed under a liquid crystal cell 110 and a backlight 130 is disposed under the collimating polarizer 120. The liquid crystal cell 110 includes first and second substrates 111 and 112 facing each other and having respective electrodes 113 and 114 on inner sides, and a liquid crystal layer 115 between the first and second substrates 111 and 112. A cholesteric liquid crystal (CLC) 117 is formed on an outer side of the first substrate 111. A plurality of thin film transistors (TFTs) and pixel electrodes (not shown) may be formed on the inner side of the first substrate 111 and a common electrode (not shown) may be formed on the inner side of the second substrate 112. Otherwise, a common electrode may be formed on the inner side of the first substrate 111 and a plurality of TFTs and pixel electrodes may be formed on the inner side of the second substrate 112. The collimating polarizer 120 includes a circular polarizer 122 of a cholesteric liquid crystal on a transparent substrate 121, and a collimating layer 123 under the transparent substrate 121 having a condensing pattern. The backlight 130 may include a lamp 131 as a linear light source and a light guide 132 to convert a linear light source to a plane light source. To increase condensability, a pattern for condensation can be formed on a surface of the light guide 132 or an additional condensing film can be disposed over the light guide 132.

A diffusing layer 140 is disposed over the liquid crystal cell 110 and a retardation layer 150 is disposed over the diffusing layer 140. Moreover, a linear polarizer 160 is disposed over the retardation layer 150. The diffusing layer 140 of holography shape diffuses transmitted light by diffraction. The retardation layer 150 having a retardation value of λ/4 converts polarization of light, i.e., linear to circular polarization and circular to linear polarization.

In the LCD device according to the present invention, brightness and viewing angle are improved by using a circular or collimating polarizer and a collimating layer. Since the collimating polarizer and the collimating layer are formed on one substrate, the fabricating process is simplified and production cost is reduced. Moreover, thickness of the LCD device may be reduced.

FIGS. 5A to 5G are schematic cross-sectional views showing a fabricating process of a collimating polarizer according to a first embodiment of the present invention.

Figure 5A:
FIGS. 5A to 5G are schematic cross-sectional views showing a fabricating process of a collimating polarizer according to a first embodiment of the present invention.

In FIG. 5A, a cholesteric liquid crystal (CLC) layer 122a is formed on a first transparent substrate 124. The cholesteric liquid crystal layer 122a may be formed by a coating method, especially, a roll coating method using a roller so that a surface can be planarized and the cholesteric liquid crystal layer 122a can have a uniform thickness. A transparent plastic substrate may be used as the first transparent substrate 124.

Figure 5B:
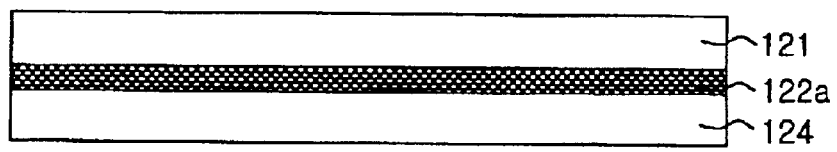

In FIG. 5B, a second transparent substrate 121 is disposed on the cholesteric liquid crystal layer 122a. The second transparent substrate 121 also can use a transparent plastic substrate. The thickness of the cholesteric liquid crystal layer 122a is adjusted by passing the first and second transparent substrates 124 and 121 having the cholesteric liquid crystal layer 122a therebetween through two rollers spaced apart from each other.

Figure 5C:
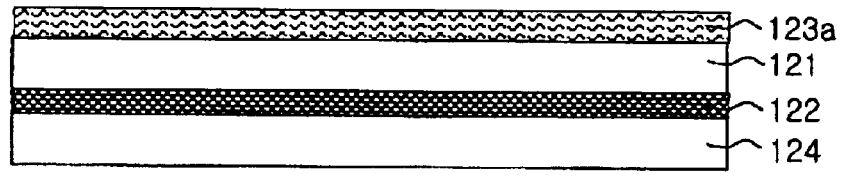

In FIG. 5C, after exposing the cholesteric liquid crystal layer 122a (of FIG. 5B) to light such as ultraviolet (UV) light to select a pitch and hardening the exposed cholesteric liquid crystal layer to form a circular polarizer 122, material such as light curable resin is coated on the second transparent substrate 121 to form a resin 123a. The organic film 123a is coated by a plane roll and then patterned by a stamp to provide a condensing pattern on the organic film 123a. Otherwise the organic film 123a may be coated and simultaneously patterned by an embossed roll. A condensing film or collimating layer is completed by hardening the patterned organic film 123a with UV or heat. The organic film 123a may be hardened after coating and patterning or at the same time with patterning to form a condensing film or collimating layer 123. The pattern of the condensing film or collimating layer 123 is one of prism shape, holography shape in which a incoherent light is added to transmitted light for reproduction and a micro lens shape having two side surfaces that circular, or circular and planar.

Figure 5D:
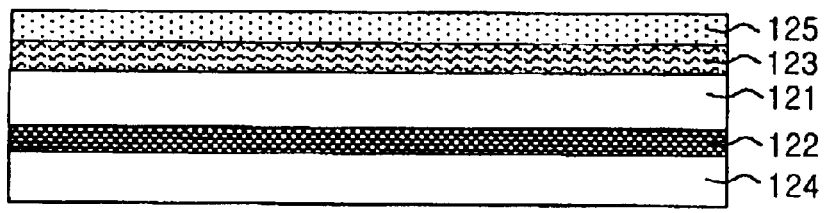

In FIG. 5D, a first protection film 125 is attached on the condensing film 123 for protection.

Figure 5E:
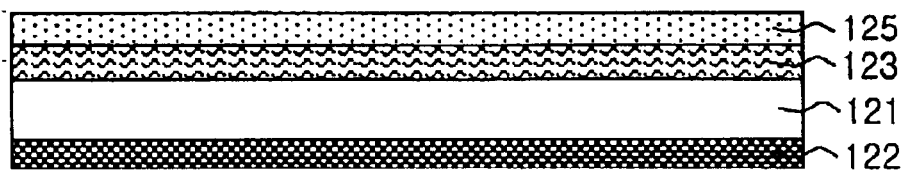
Figure 5F:
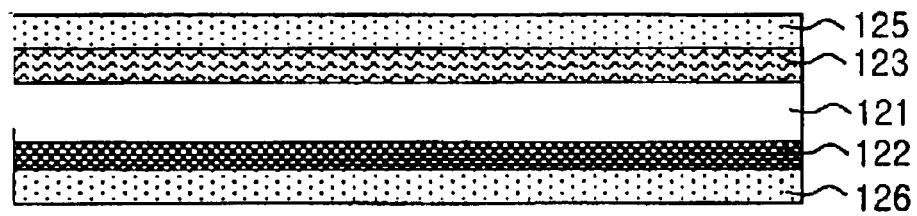

In FIGS. 5E and 5F, after the first transparent substrate 124 under the circular polarizer 122 is eliminated, a second protection film 126 is attached under the circular polarizer 122.

Figure 5G:
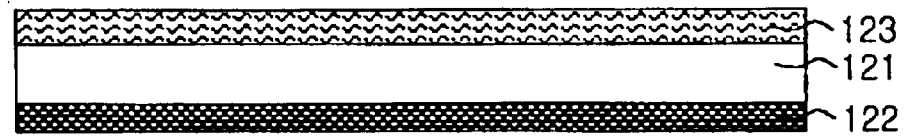

Therefore, an integrated condensing or collimating polarizer is provided in a state of FIG. 5F to protect the circular polarizer 122 and the collimating layer 123. When the integrated collimating polarizer is used for an LCD device, the first and second protection films 125 and 126 are eliminated as shown in FIG. 5G. Moreover, the integrated collimating polarizer may be attached to the liquid crystal cell 110 (of FIG. 4) or to the backlight 130.

Even though the diffusing layer is disposed over the liquid crystal cell in the first embodiment of the present invention, the diffusing layer may be disposed in the liquid crystal cell to improve the display quality. Here, the diffusing layer may be disposed between the second substrate 112 and the second electrode 114 or between the second electrode 114 and the liquid crystal layer 115.

Therefore, color shift problem according to the viewing angle of the cholesteric liquid crystal is solved due to the condensing backlight and the condensing or collimating layer and transmittance increases by using the circular polarizer and the CLC. Furthermore, brightness and viewing angle of an LCD device is improved by the diffusing the condensed light through the diffusing layer.

Figure 6:
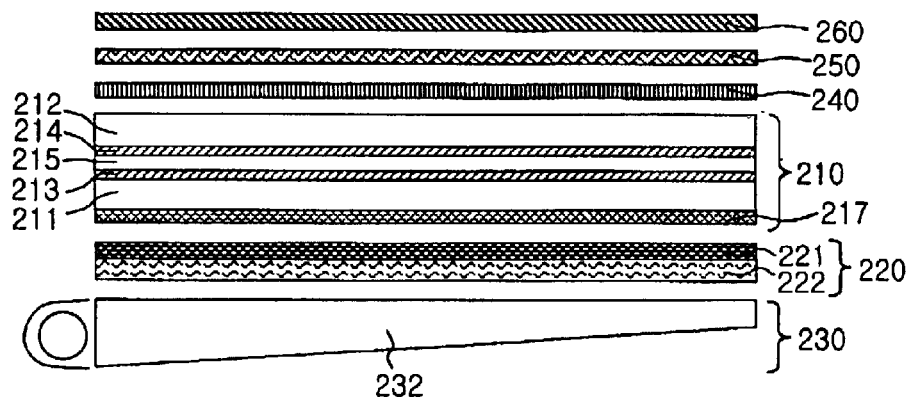
FIG. 6 is a schematic cross-sectional view of an LCD device according to a second embodiment of the present invention.

FIG. 6 is a schematic cross-sectional view of an LCD device according to a second embodiment of the present invention. The transparent substrate of FIG. 4 is omitted in FIG. 6.

In FIG. 6, an integrated condensing or collimating polarizer 220 is disposed under a liquid crystal cell 210 and a backlight 230 is disposed under the integrated collimating polarizer 220. The liquid crystal cell 210 includes first and second substrates 211 and 212 facing each other and having respective electrodes 213 and 214 on inner sides. A liquid crystal layer 215 is interposed between the respective electrodes 213 and 214 and a CLC 217 is formed on an outer side of the first substrate 211. The integrated collimating polarizer 220 includes a circular polarizer 221 of a cholesteric liquid crystal on a collimating layer 222 having a condensing pattern. The backlight 230 may include a light guide 232 having a pattern for condensation or an additional condensing film may be disposed over the light guide 232.

A diffusing layer 240 of holography shape is disposed over the liquid crystal cell 210 and a retardation layer 250 having a retardation value of $\lambda/4$ is disposed over the diffusing layer 240. Moreover, a linear polarizer 260 is disposed over the retardation layer 250.

FIGS. 7A to 7F are schematic cross-sectional views showing a fabricating process of an integrated condensing or collimating polarizer according to a second embodiment of the present invention.

Figure 7A:
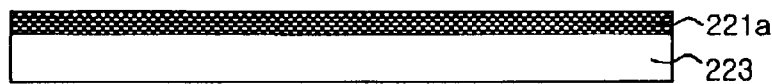
FIGS. 7A to 7F are schematic cross-sectional views showing a fabricating process of a collimating polarizer according to a second embodiment of the present invention.

In FIG. 7A, a cholesteric liquid crystal layer 221a is formed on a transparent substrate 223. The cholesteric liquid crystal layer 221a may be formed by a coating method, especially, a roll coating method using a roller so that a surface can be planarized and the cholesteric liquid crystal layer 221a can have a uniform thickness.

Figure 7B:
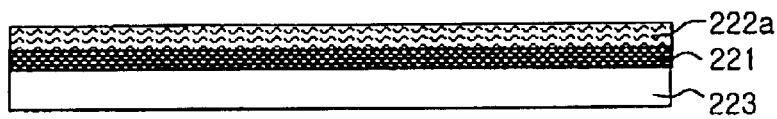

In FIG. 7B, after exposing the cholesteric liquid crystal layer 221a (of FIG. 7A) to ultraviolet (UV) light to select a pitch and hardening the exposed cholesteric liquid crystal layer to form a circular polarizer 221, material such as light curable resin is coated on the circular polarizer 221 to form a resin 222a. The organic film 222a is coated by a plane roll and then patterned by a stamp to provide a condensing pattern on the organic film 222a. Otherwise, the organic film 222a may be coated and simultaneously patterned by an embossed roll. A condensing film or collimating layer is completed by hardening the patterned organic film 222a with UV or heat. The organic film 222a may be hardened after coating and patterning or at the same time with patterning to form a condensing film or collimating layer 222. The pattern of the collimating layer 222 is one of prism shape, holography shape and a micro lens shape.

Figure 7C:
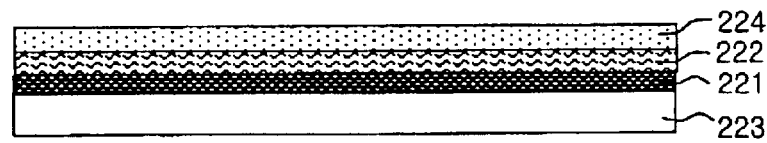

In FIG. 7C, a first protection film 224 is attached on the collimating layer 222 for protection.

Figure 7D:
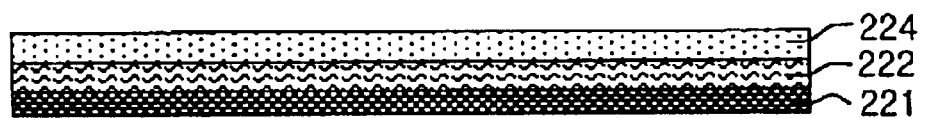
Figure 7E:
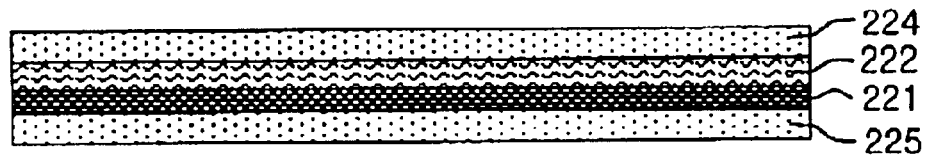
Figure 7F:

In FIGS. 7D and 7E, after the substrate 223 under the circular polarizer 221 is eliminated, a second protection film 225 is attached under the circular polarizer 221.

Since the substrate between the circular polarizer and the collimating layer of the first embodiment is eliminated from the integrated collimating polarizer according to the second embodiment of the present invention, the thickness is reduced so that brightness can be further improved due to reduction of light loss.

In the first and second embodiments, a resin is hardened with UV light and then separated from a stamp to form a condensing film or collimating layer after being coated and patterned with the stamp. In the other embodiment, the organic film may be hardened with UV after the stamp is separated.

The step of forming a circular polarizer may include steps of annealing or aging for alignment of the cholesteric liquid crystal. Moreover, after completing an integrated collimating polarizer, an additional annealing for complete hardening may be included.

For attaching an integrated collimating polarizer to a liquid crystal cell, a glue is coated on a surface of the integrated collimating polarizer before the second protection film is formed or a film treated with a glue is used as the second protection film for the glue to be transcribed to the integrated collimating polarizer.

Consequently, the color shift problem according to the viewing angle of the cholesteric liquid crystal is solved due to the condensing backlight and the condensing film or collimating layer and transmittance increases by using the circular polarizer and the CLC. Accordingly, brightness and viewing angle of an LCD device is improved. The fabricating process is simplified and the production cost is reduced through forming a condensing film or collimating layer and a circular polarizer on one substrate. The thickness of the LCD device is also reduced. The thickness of the LCD device may be further reduced and brightness may be further improved by eliminating a substrate between the circular polarizer and the condensing film or collimating layer.

It will be apparent to those skilled in the art that various modifications and variation can be made in the method of manufacturing a flat panel display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:

a liquid crystal cell;

a collimating polarizer under the liquid crystal cell, the collimating polarizer having a collimating layer and a circular polarizer which is fixed on the collimating layer;

a backlight under the collimating polarizer;

a diffusing layer over the liquid crystal cell;

a retardation layer over the diffusing layer; and a linear polarizer over the retardation layer.

2. The device according to claim 1, wherein the circular polarizer has cholesteric liquid crystal.

3. The device according to claim 1, wherein the collimating layer has a condensing pattern and the condensing pattern is one of prism pattern, holographic pattern and micro lens pattern.

4. The device according to claim 1, wherein the collimating layer has a condensing pattern, wherein the collimating pattern is a micro lens pattern and wherein the micro lens pattern is an array.

5. The device according to claim 1, wherein the diffusing layer is holographic pattern.

6. The device according to claim 1, wherein the liquid crystal cell includes first and second substrates facing each other and having respective electrodes on inner sides of the first and second substrates, and a liquid crystal layer between the respective electrodes.

\* \* \* \* \*